United States Patent
Wang

(10) Patent No.: US 10,929,838 B2
(45) Date of Patent: Feb. 23, 2021

(54) CARD NOT PRESENT TRANSACTION SYSTEM AND METHOD FOR OPERATING CARD NOT PRESENT TRANSACTION SYSTEM TO SIMPLIFY HARDWARE REQUIRED AT CLIENT SITES

(71) Applicant: LEADOT INNOVATION, INC., Kaohsiung (TW)

(72) Inventor: Justin Wang, Taipei (TW)

(73) Assignee: LEADOT INNOVATION, INC., Kaohsiung (TW)

( * ) Notice: Subject to any disclaimer, the term of this patent is extended or adjusted under 35 U.S.C. 154(b) by 158 days.

(21) Appl. No.: 16/249,872

(22) Filed: Jan. 16, 2019

(65) Prior Publication Data

US 2019/0228404 A1 Jul. 25, 2019

Related U.S. Application Data

(60) Provisional application No. 62/619,128, filed on Jan. 19, 2018.

(30) Foreign Application Priority Data

Jan. 7, 2019 (TW) ................................ 108100544

(51) Int. Cl.
*G06Q 20/34* (2012.01)
*G06Q 20/38* (2012.01)
(Continued)

(52) U.S. Cl.
CPC ....... *G06Q 20/3567* (2013.01); *G06Q 20/202* (2013.01); *G06Q 20/204* (2013.01);
(Continued)

(58) Field of Classification Search
CPC ......... G06Q 20/3567; G06Q 20/38215; G06Q 20/3276; G06Q 20/385; G06Q 20/202;
(Continued)

(56) References Cited

U.S. PATENT DOCUMENTS 8,188,707 B2 5/2012 McBurney
8,332,323 B2 * 12/2012 Stals ...................... G06Q 20/10
705/44

(Continued)

FOREIGN PATENT DOCUMENTS

JP 2002-7918 A 1/2002
JP 2006-23843 A 1/2006
(Continued)

OTHER PUBLICATIONS

Mitsuo Komiyama, Mobile Transaction and Token Technology, Provision, Feb. 23, 2017, pp. 44-49, No. 91, IBM, Japan.

*Primary Examiner* — Ashford S Hayles
(74) *Attorney, Agent, or Firm* — Winston Hsu

(57) ABSTRACT

A card not present (CNP) transaction system includes a transaction control device for scanning a barcode to obtain transaction information and an address of a middleware and to send a connection message to the address of the middleware according to the transaction information, the middleware for establishing a connection with a transaction control device according to the connection message received, to obtain a transaction token and a transaction amount from the transaction control device through the connection and to send a transaction message according to the transaction token and the transaction amount, and an acquirer server for receiving the transaction message to establish a connection with the middleware and to generate a transaction confirmation message to the middleware according to the transaction message after verifying the transaction token.

10 Claims, 3 Drawing Sheets

(51) Int. Cl.
*G06Q 20/20* (2012.01)
*H04L 9/32* (2006.01)
*G06Q 20/32* (2012.01)
*G06K 7/14* (2006.01)
*G06F 21/62* (2013.01)

(52) U.S. Cl.
CPC ....... *G06Q 20/3276* (2013.01); *G06Q 20/385* (2013.01); *G06Q 20/38215* (2013.01); *H04L 9/3213* (2013.01); *H04L 9/3234* (2013.01); *G06F 21/6245* (2013.01); *G06K 7/1417* (2013.01); *H04L 2209/56* (2013.01)

(58) Field of Classification Search
CPC .. G06Q 20/204; G06Q 20/347; G06Q 20/409; G06Q 20/401; H04L 9/3213; H04L 9/3234; H04L 2209/56; G06F 21/6245; G06K 7/1417
See application file for complete search history.

(56) References Cited

U.S. PATENT DOCUMENTS

| | | | | |
|---|---|---|---|---|
| 8,616,439 | B1* | 12/2013 | Azen | G06Q 20/3276 235/375 |
| 8,840,016 | B1 | 9/2014 | Schott | |
| 8,984,276 | B2* | 3/2015 | Benson | H04W 12/06 713/155 |
| 9,047,728 | B1 | 6/2015 | Irudayam | |
| 9,361,610 | B2* | 6/2016 | Matotek | G06Q 20/3229 |
| 9,852,417 | B2* | 12/2017 | Tyler | G06Q 20/3274 |
| 10,445,629 | B2* | 10/2019 | Singh | G06Q 20/3827 |
| 2004/0010695 | A1 | 1/2004 | Sahota | |
| 2005/0025358 | A1* | 2/2005 | Qi | G06T 7/20 382/170 |
| 2005/0102188 | A1* | 5/2005 | Hutchison | G06Q 30/0601 705/39 |
| 2005/0125301 | A1* | 6/2005 | Muni | G06Q 20/208 705/23 |
| 2005/0203854 | A1* | 9/2005 | Das | G06Q 20/382 705/64 |
| 2005/0211763 | A1* | 9/2005 | Sgambati | H04L 63/12 235/379 |
| 2007/0194123 | A1* | 8/2007 | Frantz | G06K 17/0022 235/462.45 |
| 2007/0194127 | A1* | 8/2007 | Rathus | G06Q 30/02 235/472.02 |
| 2008/0222048 | A1* | 9/2008 | Higgins | G06Q 20/4012 705/67 |
| 2008/0272188 | A1 | 11/2008 | Keithley | |
| 2009/0077646 | A1 | 3/2009 | Sahota | |
| 2009/0240626 | A1* | 9/2009 | Hasson | G06Q 20/204 705/75 |
| 2010/0211506 | A1* | 8/2010 | Chang | G06Q 20/3823 705/65 |
| 2011/0010291 | A1 | 1/2011 | Adams | |
| 2012/0078735 | A1* | 3/2012 | Bauer | G06Q 20/20 705/16 |
| 2012/0130889 | A1* | 5/2012 | Lyons | G06Q 20/3272 705/39 |
| 2012/0150750 | A1 | 6/2012 | Law | |
| 2012/0203697 | A1* | 8/2012 | Morgan | G06Q 20/322 705/44 |
| 2012/0209749 | A1* | 8/2012 | Hammad | G06Q 20/204 705/27.1 |
| 2012/0246018 | A1* | 9/2012 | Sathe | G06F 3/0482 705/16 |
| 2013/0238455 | A1* | 9/2013 | Laracey | G06Q 20/108 705/21 |
| 2013/0246203 | A1* | 9/2013 | Laracey | G06Q 20/401 705/21 |
| 2014/0143075 | A1* | 5/2014 | Eason, Jr. | G06Q 20/322 705/17 |
| 2014/0201084 | A1 | 7/2014 | Dagenais | |
| 2014/0207682 | A1 | 7/2014 | Wolfond | |
| 2014/0279403 | A1* | 9/2014 | Baird | G06Q 20/4015 705/38 |
| 2014/0365371 | A1* | 12/2014 | Ohlhausen | G06Q 20/42 705/44 |
| 2015/0134538 | A1 | 5/2015 | Kim | |
| 2015/0248664 | A1 | 9/2015 | Makhdumi | |
| 2015/0278805 | A1* | 10/2015 | Spencer, III | G06Q 20/3278 705/44 |
| 2015/0348024 | A1* | 12/2015 | Asokan | G06Q 20/3272 705/76 |
| 2016/0292684 | A1 | 10/2016 | Youn | |
| 2018/0006821 | A1 | 1/2018 | Kinagi | |
| 2018/0315045 | A1* | 11/2018 | Leyva | G06Q 20/388 |
| 2019/0236585 | A1* | 8/2019 | Jeong | G06Q 20/326 |
| 2019/0385160 | A1* | 12/2019 | Safak | G06Q 20/3227 |
| 2019/0392422 | A1* | 12/2019 | Yim | G06Q 20/3274 |

FOREIGN PATENT DOCUMENTS

| | | |
|---|---|---|
| JP | 2008-197817 A | 8/2008 |
| JP | 2009-237969 A | 10/2009 |
| JP | 2011-210171 A | 10/2011 |
| JP | 2015-22653 A | 2/2015 |
| JP | 2015-526774 A | 9/2015 |
| JP | 2016-173752 A | 9/2016 |
| KR | 10-1706894 B1 | 2/2017 |
| TW | I462041 B | 11/2014 |
| TW | 201447635 A | 12/2014 |
| TW | 201545086 A | 12/2015 |
| TW | M514064 U | 12/2015 |
| TW | M532613 U | 11/2016 |
| WO | 2016/141356 A1 | 9/2016 |
| WO | 2018/006060 A1 | 1/2018 |

\* cited by examiner

CARD NOT PRESENT TRANSACTION SYSTEM AND METHOD FOR OPERATING CARD NOT PRESENT TRANSACTION SYSTEM TO SIMPLIFY HARDWARE REQUIRED AT CLIENT SITES

CROSS REFERENCE TO RELATED APPLICATIONS

This application claims the benefit U.S. provisional application No. 62/619,128, filed on Jan. 19, 2018 and incorporated herein by reference.

BACKGROUND OF THE INVENTION

1. Field of the Invention

The present invention is related to a card not present transaction system, and more particularly to a card not present transaction system using middleware to simplify hardware required at client sites.

2. Description of the Prior Art

Paperless transactions provide consumers with convenient choices. But for a merchant, in order to provide a variety of different paperless transactions such as credit card payments, it is often necessary to connect to financial service providers through different electronic equipment. Since the equipment adds additional cost and needs to be purchased from the financial service providers, it is inconvenient for the merchant.

For example, in order to provide mobile payment service, such as Apple Pay or Samsung Pay, the merchant must set up an authorized card reader to read the transaction token stored in a user's mobile phone. Since the merchant must make a transaction request to the remote transaction server through a specific card reader, it is not so flexible in implementing the service.

SUMMARY OF THE INVENTION

An embodiment discloses a card not present (CNP) transaction system. The CNP includes a transaction control device configured to scan a barcode to obtain transaction information and an address of a middleware, and to send a connection message to the address of the middleware according to the transaction information, the middleware configured to establish a connection with a transaction control device according to the connection message received, to obtain a transaction token and a transaction amount from the transaction control device through the connection and to send a transaction message according to the transaction token and the transaction amount, and an acquirer server configured to receive the transaction message to establish a connection with the middleware and to generate a transaction confirmation message to the middleware according to the transaction message after verifying the transaction token.

Another embodiment discloses a method for operating a card not present (CNP) transaction system. The CNP transaction system comprises a transaction control device, a middleware, and an acquirer server. The method includes the transaction control device scanning a barcode to obtain transaction information and an address of the middleware, the transaction control device sending a connection message to the address of the middleware according to the transaction information, the middleware receiving the connection message to establish a connection with the transaction control device, the middleware obtaining a transaction token and a transaction amount from the transaction control device through the connection, the middleware sending a transaction message according to the transaction token and the transaction amount, the acquirer server receiving the transaction message to establish a connection with the middleware, and the acquiring server generating a transaction confirmation message to the middleware according to the transaction information after verifying the transaction token.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
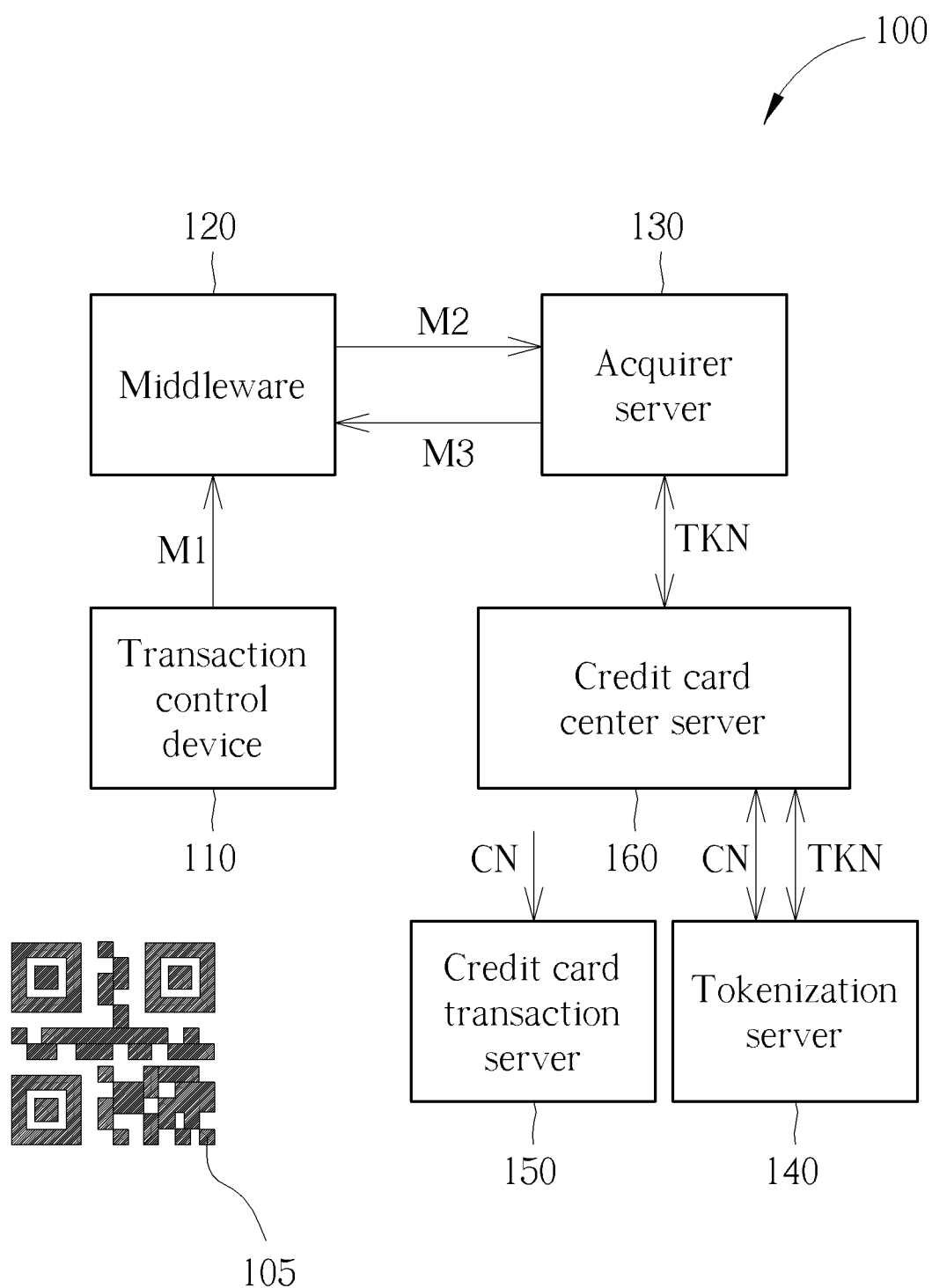
FIG. 1 is a diagram of a card not present (CNP) transaction system according to an embodiment of the present invention.

FIG. 1 is a diagram of a card not present (CNP) transaction system according to an embodiment of the present invention. The CNP transaction system 100 comprises a transaction control device 110, a middleware 120, and an acquirer server 130.

In some embodiments, the transaction control device 110 can be a smart phone or a tablet computer. When a user wants to use the transaction control device 110 to make an online payment, he can use the transaction control device 110 to scan a barcode 105 provided by a merchant to obtain transaction information and the address of the middleware 120. The transaction control device 110 can then send a connection message M1 to the address of the middleware 120 according to the transaction information. In some embodiments, the barcode 105 provided by the merchant may be a one-dimensional barcode or a two-dimensional barcode.

After receiving the connection message M1, the middleware 120 can establish a connection with the transaction control device 110, and obtain a transaction token and the transaction amount from the transaction control device 110 through the connection. In some embodiments of the invention, the transaction token corresponds to a credit card number. For example, the CNP transaction system 100 can implement a particular tokenization service to convert a credit card number to a corresponding transaction token that can be securely stored in a mobile device. Companies currently offering tokenization service include VISA and MasterCard. In other words, after a user attaches his credit card to the transaction control device 110, it can perform transactions by connecting to the middleware 120.

After obtaining the transaction token and the transaction amount, the middleware 120 sends a transaction message M2 according to the transaction token and the transaction amount to the acquirer server 130. The acquirer server 130 can receive the transaction message M2 to establish a connection with the middleware 120. After verifying the transaction token, the acquirer server 130 generates a transaction confirmation message M3 according to the transaction message M2 and sends it to the middleware 120.

In some embodiments, the acquirer server 130 may be set up by the companies that provide mobile payment service, such as Apple Pay by Apple or Samsung Pay by Samsung. In the prior art, the merchant uses a card reader to read the transaction token corresponding to the credit card attached to the mobile phone by Near Field Communication (NFC), and the card reader would then connect to the acquirer server 130 for subsequent transactions. In order to ensure transaction data security, the communication between the acquirer server 130 and the card reader needs specific information with a specific format. In this embodiment, after obtaining the transaction token and the transaction amount, the middleware 120 can simulate the behavior of the card reader to establish a connection with the acquirer server 130. In other words, the middleware 120 actually transmits the transaction token to the acquirer server 130 according to the communication format of the card reader.

Through the middleware 120, a merchant would not need to set up an additional card reader in order to provide mobile payment service to customers, thereby simplifying the required hardware. In addition, the middleware 120 can also include a memory to store the transaction message M2 for user inquiry in the future.

In the embodiment of FIG. 1, in order to verify the transaction token, the CNP transaction system 100 may include a tokenization server 140, a credit card transaction server 150, and a credit card center server 160. The credit card center server 160 can be set up, for example, by a credit card organization. The credit card center server 160 would transmit the transaction token TKN from the acquirer server 130 to the tokenization server 140.

The tokenization server 140 can detokenize the transaction token TKN to obtain the credit card number CN. For example, the tokenization server 140 can be set up by a tokenization service provider. The transaction token TKN can also be detokenized to the corresponding credit card number CN. Then, the tokenization server 140 transmits the credit card number CN back to the credit card center server 160, and the credit card center server 160 transmits the credit card number CN to the corresponding credit card transaction server 150 for verification.

In other words, the credit card center server 160 obtains information relating to the credit card issuer based on the credit card number CN and transmits the credit card number CN to the credit card transaction server 150 set up by the credit card issuer. In this way, the credit card transaction server 150 can verify the credit card issued by the issuer, and the transaction corresponding to the transaction message M2 would be processed after the credit card number CN is verified.

In addition, in some embodiments, the credit card center server 160 may also transmit the credit card number CN to the tokenization server 140, and the tokenization server 140 tokenizes the credit card number CN into the transaction token TKN. The transaction token TKN is then transmitted to the credit card center server 160. Then, the credit card center server 160 transmits the transaction token TKN to the acquirer server 130 to confirm the transaction. In this way, the acquirer server 130 and the merchant cannot obtain the real credit card number CN, so the process of the payment is more secure.

Figure 2:
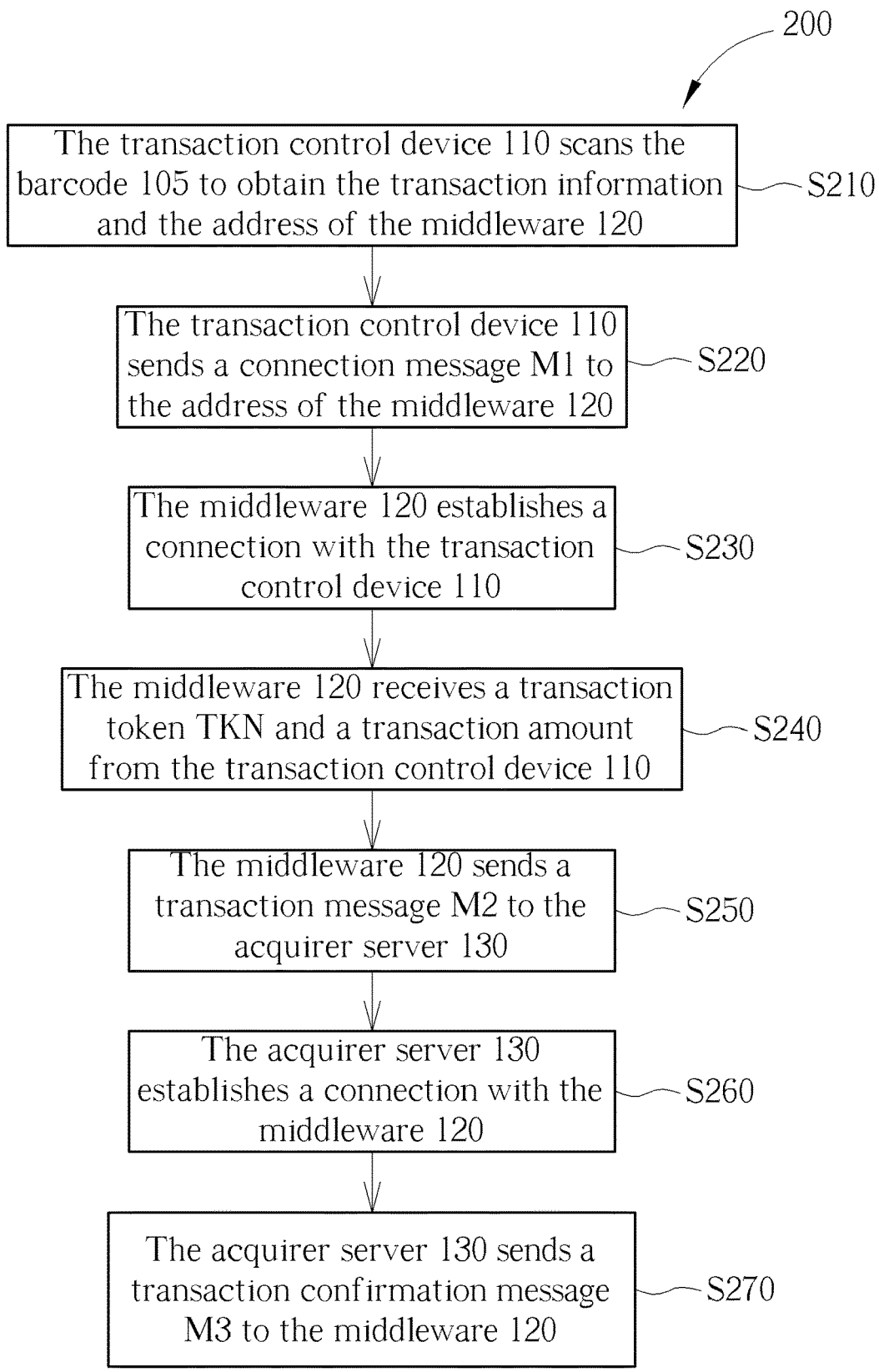
FIG. 2 is a flow chart showing a method of operating the CNP transaction system of FIG. 1 according to an embodiment.

FIG. 2 is a flow chart of a method 200 for operating the card not present (CNP) transaction system 100 in according to an embodiment. Method 200 includes steps S210 through S270.

S210: The transaction control device 110 scans the barcode 105 to obtain the transaction information and the address of the middleware 120;

S220: The transaction control device 110 sends a connection message M1 to the address of the middleware 120 according to the transaction information;

S230: The middleware 120 receives the connection message M1 to establish a connection with the transaction control device 110;

S240: The middleware 120 receives a transaction token TKN and a transaction amount from the transaction control device 110;

S250: The middleware 120 sends a transaction message M2 to the acquirer server 130 according to the transaction token TKN and the transaction amount;

S260: The acquirer server 130 receives the transaction message M2 to establish a connection with the middleware 120;

S270: After verifying the transaction token TKN, the acquirer server 130 generates a transaction confirmation message M3 according to the transaction message M2 and sends it to the middleware 120.

Through the method 200, the merchant does not need to set up additional card reader in order to provide mobile payment service, therefore it simplifies required hardware and increases the flexibility of implementing the service.

Figure 3:
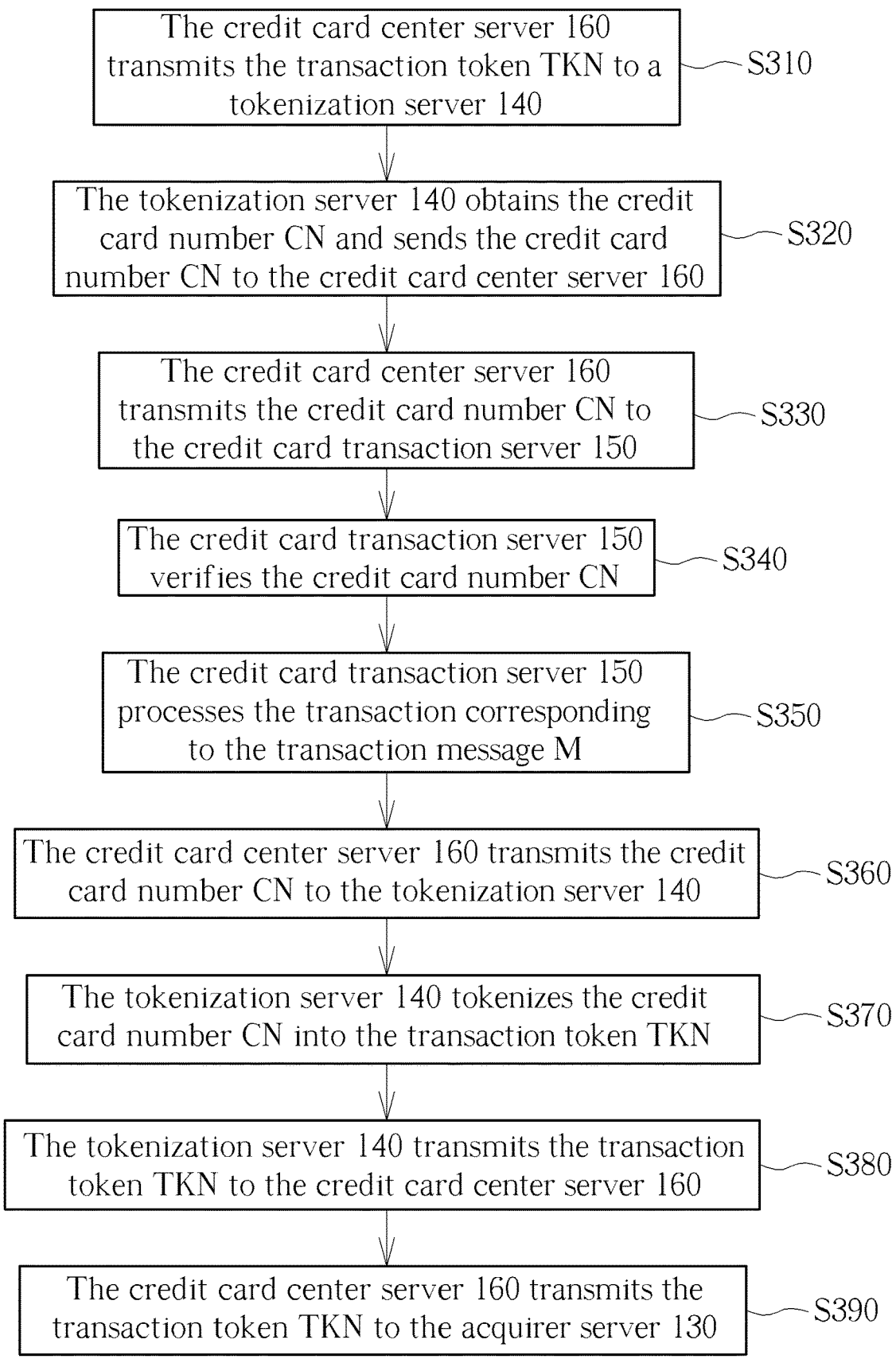
FIG. 3 is a flow chart showing the steps of verifying the transaction token of the method in FIG. 2.

FIG. 3 is a flow chart showing the steps of verifying the transaction token TKN in the method for operating the card not present (CNP) transaction system 100. In FIG. 3, the verification process of the transaction token TKN may include steps S310 to S390.

S310: The credit card center server 160 transmits the transaction token TKN sent by the acquirer server 130 to a tokenization server 140;

S320: The tokenization server 140 detokenizes the transaction token TKN to obtain the credit card number CN and transmits the credit card number CN to the credit card center server 160;

S330: The credit card center server 160 transmits the credit card number CN to the credit card transaction server 150;

S340: The credit card transaction server 150 verifies the credit card number CN;

S350: The credit card transaction server 150 processes the transaction corresponding to the transaction message M2;

S360: The credit card center server 160 transmits the credit card number CN to the tokenization server 140;

S370: The tokenization server 140 tokenizes the credit card number CN into the transaction token TKN;

S380: The tokenization server 140 transmits the transaction token TKN to the credit card center server 160;

S390: The credit card center server 160 transmits the transaction token TKN to the acquirer server 130 to confirm the transaction.

Through steps S310 to S390, the CNP transaction system 100 can verify the transaction token TKN online and prevent the merchant from obtaining the information on the credit card number CN and the credit card owner, thus it increases the security of payment process.

In summary, the CNP transaction system and the operating method of the CNP transaction system disclosed by the embodiments can be implemented to replace the card reader with the middleware, so that the merchant can provide mobile payment service without the need of the card reader. Thus it simplifies hardware require and increases the flexibility of implementing the service.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A card not present (CNP) transaction system comprising:
    a transaction control device configured to scan a barcode to obtain transaction information and an address of a middleware, and to send a connection message to the address of the middleware according to the transaction information;
    the middleware configured to establish a connection with a transaction control device according to the connection message received, to obtain a transaction token and a transaction amount from the transaction control device through the connection, and to send a transaction message according to the transaction token and the transaction amount; and
    an acquirer server configured to receive the transaction message to establish a connection with the middleware, and to generate a transaction confirmation message to the middleware according to the transaction message after verifying the transaction token;
    wherein the middleware transmits the transaction token according to a communication format of a card reader to the acquirer server.

2. The CNP transaction system of claim 1, wherein the transaction control device is a smart phone or a tablet computer.

3. The CNP transaction system of claim 1, wherein the middleware comprises a memory configured to store the transaction message.

4. The CNP transaction system of claim 1, wherein the transaction token corresponds to a credit card number.

5. The CNP transaction system of claim 4 further comprising:
    a tokenization server configured to detokenize the transaction token to obtain the credit card number;
    a credit card transaction server configured to verify the credit card number and to process a transaction corresponding to the transaction message; and
    a credit card center server configured to transmit the transaction token sent by the acquirer server to the tokenization server and to transmit the credit card number to the credit card transaction server for verification.

6. The CNP transaction system of claim 5, wherein
    the credit card center server transmits the credit card number to the tokenization server;
    the tokenization server tokenizes the credit card number into the transaction token and to transmit the transaction token to the credit card center server; and
    the credit card center server transmits the transaction token to the acquirer server to confirm the transaction.

7. A method for operating a card not present (CNP) transaction system, the CNP transaction system comprising a transaction control device, a middleware, and an acquirer server, the method comprising:
    the transaction control device scanning a barcode to obtain transaction information and an address of the middleware;
    the transaction control device sending a connection message to the address of the middleware according to the transaction information;
    the middleware receiving the connection message to establish a connection with the transaction control device;
    the middleware obtaining a transaction token and a transaction amount from the transaction control device through the connection;
    the middleware sending a transaction message according to the transaction token and the transaction amount to the acquirer server;
    the acquirer server receiving the transaction message to establish a connection with the middleware; and
    the acquiring server generating a transaction confirmation message to the middleware according to the transaction information after verifying the transaction token;
    wherein the middleware sending the transaction message according to the transaction token and the transaction amount to the acquirer server comprises the middleware transmitting the transaction token according to a communication format of a card reader to the acquirer server.

8. The method of claim 7, wherein the transaction token corresponds to a credit card number.

9. The method of claim 8, wherein the CNP transaction system further comprises a tokenization server, a credit card transaction server and a credit card center server, the method further comprising:
    the credit card center server transmitting the transaction token sent by the acquirer server to the tokenization server;
    the tokenization server detokenizing the transaction token to obtain the credit card number;
    the credit card center server transmitting the credit card number to the credit card transaction server;
    the credit card transaction server verifying the credit card number; and
    the credit card transaction server processing a transaction corresponding to the transaction message.

10. The method of claim 9 further comprising:
    the credit card center server transmitting the credit card number to the tokenization server;
    the tokenization server tokenizing the credit card number into the transaction token;
    the tokenization server transmitting the transaction token to the credit card center server; and
    the credit card center server transmitting the transaction token to the acquirer server to confirm the transaction.

* * * * *